(12) United States Patent
De Vos et al.

(10) Patent No.: US 8,758,097 B2
(45) Date of Patent: Jun. 24, 2014

(54) METHOD AND SCRAPER FOR RELEASING TISSUE CONNECTIONS BETWEEN A FILLET AND A CARCASS OF SLAUGHTERED POULTRY

(71) Applicant: Meyn Food Processing Technology B.V., Oostzaan (NL)

(72) Inventors: Ferdinand Allard De Vos, Oostzaan (NL); Jeroen Bohm, Oostzaan (NL); Marcel Verhagen, Oostzaan (NL); Pieter Willem Vonk, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/720,212

(22) Filed: Dec. 19, 2012

(65) Prior Publication Data
US 2013/0157554 A1 Jun. 20, 2013

(30) Foreign Application Priority Data

Dec. 20, 2011 (NL) ...................................... 2008001

(51) Int. Cl.
*A22C 18/00* (2006.01)
(52) U.S. Cl.
USPC ........................................................ 452/134

(58) Field of Classification Search
USPC ................... 452/6, 102–107, 115, 117, 118, 452/120–124, 132–137, 185–198
See application file for complete search history.

(56) References Cited

U.S. PATENT DOCUMENTS

| 4,682,386 | A | | 7/1987 | Hazenbroek et al. |
| 5,545,083 | A | * | 8/1996 | Bargele et al. ................ 452/136 |
| 5,697,837 | A | * | 12/1997 | Verrijp et al. ................ 452/170 |
| 5,833,527 | A | | 11/1998 | Saito |
| 6,007,416 | A | * | 12/1999 | Janssen et al. ................ 452/135 |
| 6,095,914 | A | * | 8/2000 | Cornelissen et al. ......... 452/179 |
| 6,220,953 | B1 | * | 4/2001 | Cornelissen et al. ......... 452/182 |
| 7,063,611 | B2 | * | 6/2006 | Nolten et al. ................. 452/160 |

FOREIGN PATENT DOCUMENTS

EP 1454531 9/2004

OTHER PUBLICATIONS

International Search Report for NL 2008001, dated Jun. 6, 2012.

* cited by examiner

*Primary Examiner* — Richard Price, Jr.
(74) *Attorney, Agent, or Firm* — Dority & Manning, P.A.

(57) ABSTRACT

A method is provided for releasing tissue connections between a fillet and a carcass of slaughtered poultry. In one embodiment, the method uses a scraper that includes a stem ending into a first scraping lip, which is bent to follow a carcass contour. The stem is provided with a second scraping lip for release of at least part of the fatty tissue connected to an unexposed or uncovered side of the fillet.

10 Claims, 5 Drawing Sheets

METHOD AND SCRAPER FOR RELEASING TISSUE CONNECTIONS BETWEEN A FILLET AND A CARCASS OF SLAUGHTERED POULTRY

FIELD OF THE INVENTION

The subject matter of the present disclosure relates generally to a method for releasing tissue connections between a fillet and a carcass of slaughtered poultry and to a scraper for releasing such tissue connections.

BACKGROUND OF THE INVENTION

A conventional method and scraper are known from day to day practice and are used in high-speed processing lines for harvesting high-quality fillets from poultry carcasses on industrial scale.

To date, the quality requirements of fillets are ever increasing, resulting in e.g., the need to provide fillets free of any fatty tissue still attaching to the fillets. This imposes a heavy challenge on designers and developers of machinery for automated harvesting of fillets because the removal of fatty tissue can hardly be automated.

It is therefore an object of the invention to provide a method and apparatus capable to harvest fillets of poultry of the highest feasible quality. It is also a further object of the invention to provide a method and apparatus by which the fillets can be harvested substantially free of attaching fatty tissue. It is still a further object of the invention to automate to the largest possible extent the harvesting of fillets such that they are substantially free of attaching fatty tissue. In connection with this previous object, it is also an object of the invention to save on manual labor which would otherwise be required for providing fillets that are substantially free of attaching fatty tissue.

SUMMARY OF THE INVENTION

In addition to those recited above, other objects and advantages are promoted by using a scraper and method for releasing tissue connections between a fillet and a carcass of slaughtered poultry having the features of one or more of the appended claims.

According to a first exemplary aspect of the invention, a scraper for releasing tissue connections between a fillet and a carcass of slaughtered poultry is proposed. This exemplary scraper includes a stem ending into a first scraping lip which is bent to follow a carcass contour. Such scaper differentiates from the prior art in, for example, that the stem is provided with a second scraping lip for release of at least part of the fatty tissue connected to a side of the fillet.

In an exemplary embodiment, the scraper of the invention enables that during scraping at least part of the fatty tissue connected to an exposed or uncovered side of the fillet is released therefrom. By exposed or uncovered side of the fillet, it is meant the side of the fillet that does not attach to the carcass. Accordingly the fatty tissue can be released from the fillet by a scraper that is simultaneously applied for releasing the fillet from the carcass. This is highly beneficial from a viewpoint of processing efficiency and automation and avoids the necessity to manually remove the fatty tissue afterwards when processing of the fillets is complete. The harvesting of the fillets can therefore be maintained at high speed whilst even improving on the quality of the harvested fillets and reducing the costs to acquire such high-quality fillets.

Advantageously, the second scraping lip is shaped as a protrusion extending in line of the stem thus departing from the contour of the carcass. This measure enables that the fatty tissue is removed by scraping it from the surface of the fillet.

To promote the scraping of the fatty tissue from the surface of the fillet, in one exemplary embodiment, it is advantageous that the second scraping lip is slightly offset with reference to the plane of the stem and/or the first scraping lip so as to introduce some play between the surface of the carcass and the second scraping lip at the time this second scraping lip is out of contact with the carcass. Such causes that during the scraping action the second scraping lip then will damage a membrane connecting the fatty tissue with the outer side of the fillet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
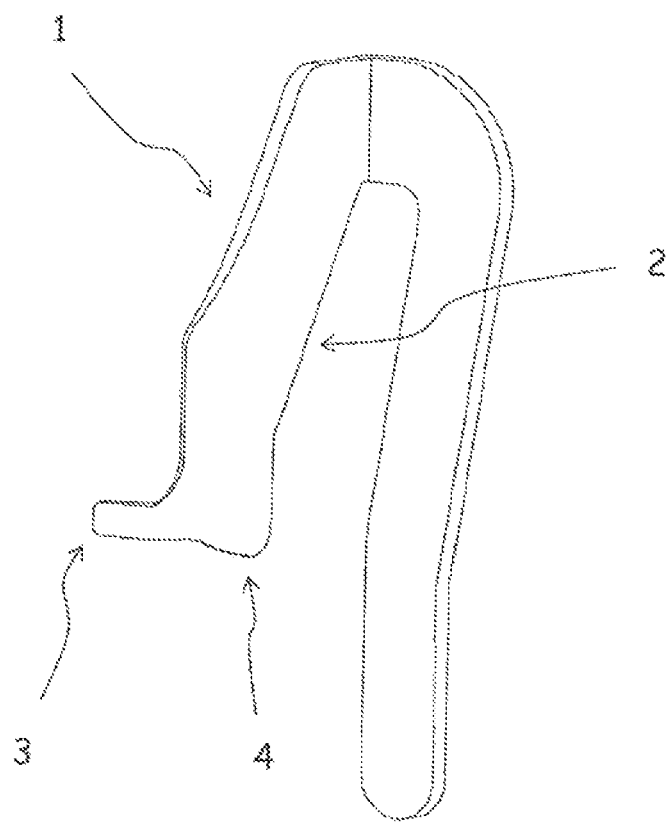
FIG. 1 shows an exemplary embodiment of a scraper of the invention in a side view.
Figure 2:
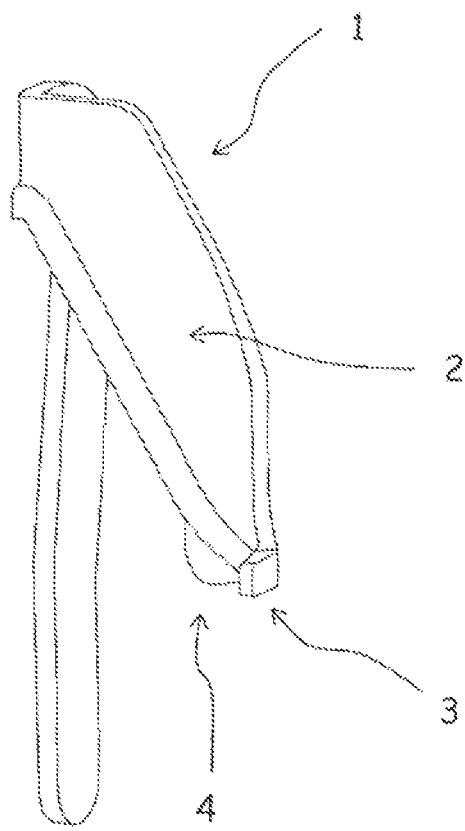
FIG. 2 shows the exemplary scraper of embodiment of FIG. 1 from below.
Figure 3:
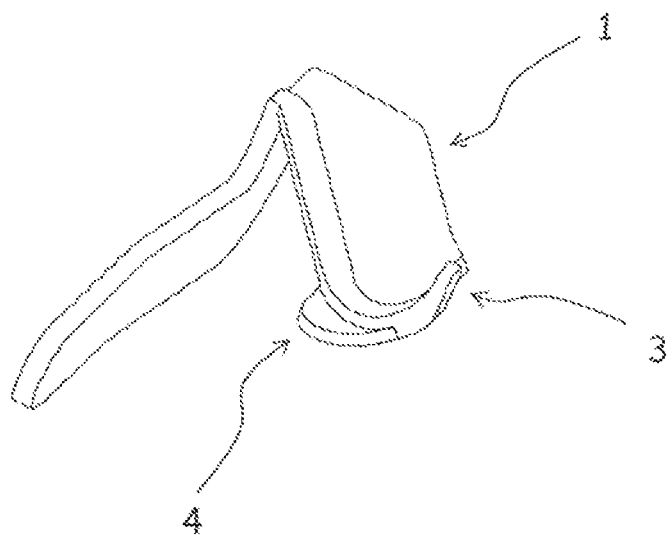
FIG. 3 indicates an exemplary embodiment of the scraper with a view at the first and second scraping lip.

With reference FIGS. 1-3, an exemplary embodiment of the scraper of the invention is generally denoted with reference 1. The scraper 1 is in accordance with its function intended for releasing tissue connections between a fillet 5 (see FIGS. 4 and 5) and a carcass of slaughtered poultry. The scraper includes a stem 2 ending into a first scraping lip 3, which is bent out of the plane of the stem 2 to follow a carcass contour. This scraping lip 3 shaped according to the carcass contour ensures that during scraping the carcass is kept accurately positioned on the carrier 7 (see FIG. 5) for the carcass.

In accordance with an exemplary aspect of the invention, the stem 2 is provided with a second scraping lip 4 for release of at least part of the fatty tissue 6 connected to a side of the fillet 5. See again FIG. 5.

As can be best seen in FIG. 1, the second scraping lip 4 is shaped as a protrusion extending in line of the stem 2 thus departing from the contour of the carcass, which contour accords with the line of the stem 2 into the first scraping lip 3.

Figure 4:
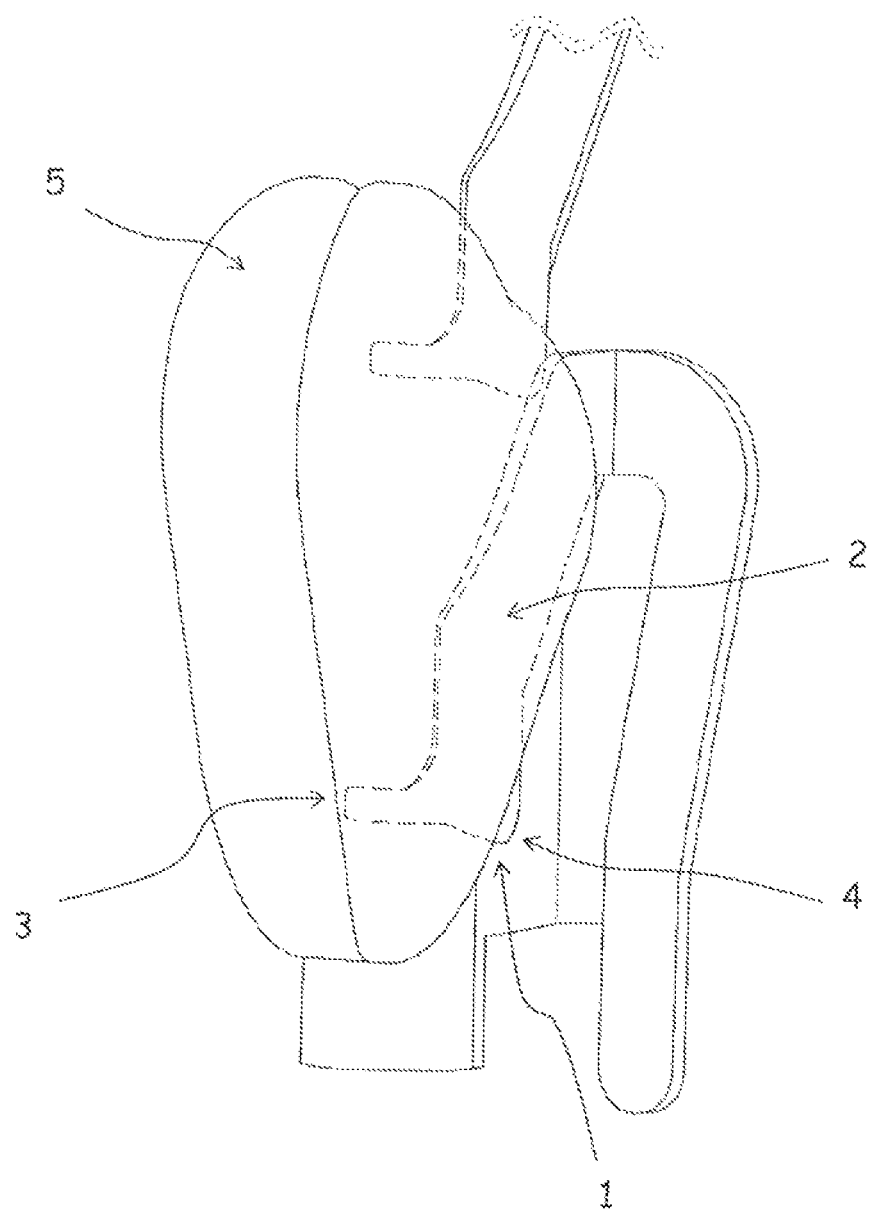
FIG. 4 schematically shows frontally the use of an exemplary scraper of the invention while processing a carcass on its carrier.
Figure 5:
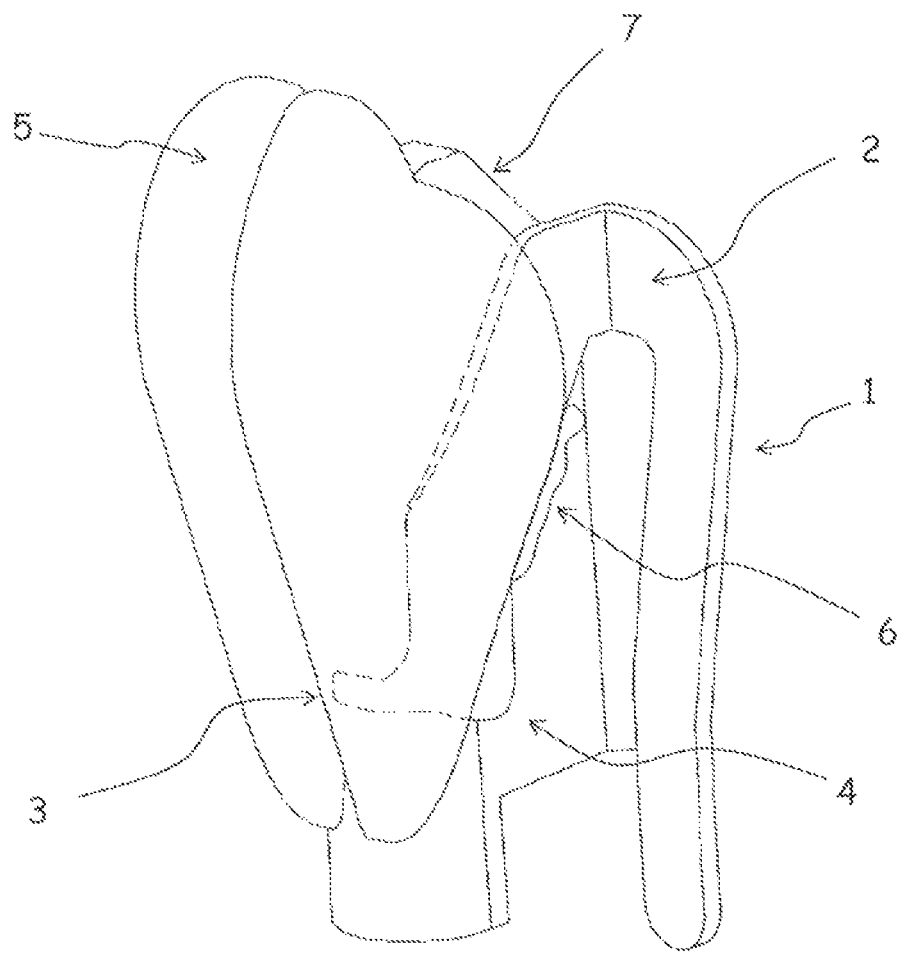
FIG. 5 shows the processing of FIG. 4 in a side view.

A further aspect is shown in FIG. 3, which reveals that the second scraping lip 4 is slightly offset with reference to the mid-plane of the stem 2 and/or the first scraping lip 3. The offset between the second scraping lip 4 and the midplane of the stem 2 and/or the first scraping lip 3 introduces during scraping some play between the surface of the carcass and the second scraping lip 4 at the time this second scraping lip 4 loses contact with the carcass. This moment is shown in FIG. 4 (continuous line of scraper 1) and FIG. 5 and causes that the second scraping lip 4 then is in a position to damage a membrane connecting the fatty tissue 6 with the outer side of the fillet 5. Consequently during the process of scraping as schematically shown in FIGS. 4 and 5, at least part of the fatty tissue 6 connected to the concerning side of the fillet 5 is released therefrom by scraping the fatty tissue 6 from the surface of the fillet 5 by a scraper 1 that is simultaneously applied in its primary function of releasing the fillet 5 from the carcass.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A scraper for releasing tissue connections between a fillet and a carcass of slaughtered poultry, the scraper comprising:
   a stem ending into a first scraping lip, the first scraping lip being bent to follow a carcass contour along one side of the carcass, the stem also including a second scraping lip for release of at least part of a fatty tissue connected to a side of the fillet along the one side of the carcass.

2. The scraper as in claim 1, wherein the second scraping lip is shaped as a protrusion extending in line of the stem and departing from the contour of the carcass.

3. The scraper as in claim 1, wherein the second scraping lip is slightly offset with reference to the mid-plane of the stem, the first scraping lip, or both, so as to introduce some play between the surface of the carcass and the second scraping lip at the time the second scraping lip is out of contact with the carcass so as to cause that the second scraping lip then damages a membrane connecting the fatty tissue with the fillet.

4. A method for releasing tissue connections between a fillet and a carcass of slaughtered poultry, comprising the steps of:
   providing a scraper defining a plane and comprising a stem having a first scraping lip and a second scraping lip positioned at an end of the stem, the first scraping lip and the second scraping lip bent out of the plane of the stem;
   applying the first scraping lip along one side of the poultry carcass so as to scrape the fillet loose from the one side of the poultry carcass;
   wherein during the step of scraping, at least part of the fatty tissue connected to an exposed or uncovered side of the fillet is released therefrom.

5. The method as in claim 4, further comprising the step of:
   using the second scraping lip to release the fatty tissue from the fillet along the one side of the poultry carcass during said step of applying.

6. The method as in claim 4, wherein the fatty tissue is scraped from the surface of the fillet.

7. A scraper for releasing tissue connections between a fillet and a carcass of slaughtered poultry, the scraper comprising:
   a stem defining a plane;
   a first scraping lip positioned at an end of the stem, the first scraping lip bent out of the plane of the step and configured to follow a carcass contour along one side of a poultry carcass; and
   a second scraping lip positioned at the end of the stem, the second scraping lip comprising a protrusion, the second scraping lip configured to release of at least part of a fatty tissue connected to a side of the fillet along the one side of the poultry carcass.

8. The scraper as in claim 7, wherein the second scraping lip extends in line of the stem and departs from the carcass contour.

9. The scraper as in claim 7, wherein the second scraping ip is slightly offset with reference to the plane of the stem, the first scraping lip, or both.

10. The scraper as in claim 7, wherein the second scraping lip is also bent out of the plane of the stern.

* * * * *